(12) United States Patent
Wu

(10) Patent No.: US 6,617,513 B1
(45) Date of Patent: Sep. 9, 2003

(54) LAMP ROD ASSEMBLED DEVICE FOR ASSEMBLING INSERTING ROD INTO WIRE BOX

(76) Inventor: Wen-Chang Wu, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/265,456

(22) Filed: Oct. 7, 2002

(51) Int. Cl.⁷ .................................................. H02G 3/18
(52) U.S. Cl. .................... 174/65 R; 174/48; 174/50; 174/64; 313/324; 439/445; 439/611; 285/136.1
(58) Field of Search ................................. 174/65 R, 48, 174/50, 52.1, 59, 64, 65 SS; 285/120.1, 136.1, 154.1, 189; 313/324, 331; 439/207, 445, 450, 611

(56) References Cited

U.S. PATENT DOCUMENTS 5,216,203 A * 6/1993 Gower ...................... 174/65 R
5,912,431 A * 6/1999 Sheehan .................... 174/65 R
6,043,432 A * 3/2000 Gretz ........................ 174/65 R
6,441,302 B1 * 8/2002 Wu ............................. 174/50
6,455,775 B1 * 9/2002 Wu ............................. 174/54
6,489,560 B1 * 12/2002 Wu ........................... 174/65 R

* cited by examiner

Primary Examiner—Dean A. Reichard
Assistant Examiner—Adolfo Nino

(57) ABSTRACT

A lamp rod assembled device for assembling an inserting rod into a wire box comprises a retaining seat installed on a via hole at a lateral side of the wire box and an inserting rod inserted into the wire box. A polygonal though hole is formed in the engaging portion. A lateral end of the retaining seat is an engaging groove which is communicated with the though hole. A distal end of the buckling structure is protruded out of an end portion of the inserting rod. The inserting rod can be inserted into or detached from the wire box conveniently and easily. Moreover, a front end of the output end is formed with a larger stepped surface; and a front end of the guide hole is installed with a female threaded section for engaging the buckling structure.

3 Claims, 3 Drawing Sheets

LAMP ROD ASSEMBLED DEVICE FOR ASSEMBLING INSERTING ROD INTO WIRE BOX

FIELD OF THE INVENTION

The present invention relates to lamp assembly structures, and particularly to a lamp rod assembled device for assembling an inserting rod into a wire box.

BACKGROUND OF THE INVENTION

Prior wire connection devices of lamps, such as wall lamps, stand type lamps, ceiling lamps, use studs and nuts to lock the components. In assembly, not only the user is easy to be harmed, but also other locking tools (such as spanners, openers, etc.) are necessary. Moreover, in assembly, electric wires are easy to expose out and some dangers are induced. Thereby, the prior art is not suitable to be assembled by the user. In general, the manufacturer assembles the device in advance, namely, the wire box is assembled with inserting rods in the manufacturing process. However, a large space is required for transferring and storing the wire connection device and thus cost is increased.

SUMMARY OF THE INVENTION

Accordingly, the primary object of the present invention is to provide a lamp rod assembled device for assembling an inserting rod into a wire box, wherein In assembly, it is only necessary to insert the inserting rod into the retaining seat in the wire box without using any locking tool, such as stud. Thus, the user can assemble it conveniently.

Another object of the present invention is to provide a lamp rod assembled device for assembling an inserting rod into a wire box, wherein the inserting rod can be detached easily and thus in transfer and storage, the inserting rod and wire box can be separated and thus they are stored with a small volume.

To achieve above mentioned object, the present invention provides a A lamp rod assembled device for assembling an inserting rod into a wire box comprises a retaining seat installed at a via hole at a lateral side of the wire box and an inserting rod inserted into the wire box. A polygonal though hole is formed in the engaging portion. A lateral end of the retaining seat is an engaging groove which is communicated with the though hole. A distal end of the buckling structure is protruded out of an end portion of the inserting rod. Thereby, the inserting rod can be inserted into or detached from the wire box conveniently and easily. Moreover, a front end of the output end is formed with a larger stepped surface; a front end of the guide hole is installed with a female threaded section for engaging the buckling structure.

The various objects and advantages of the present invention will be more readily understood from the following detailed description when read in conjunction with the appended drawing.

BRIEF DESCRIPTION OF THE DRAWINGS

FIG. 1A is a cross section view showing the end portion of the inserting rod.

DETAILED DESCRIPTION OF THE PREFERRED EMBODIMENTS

Figure 1:
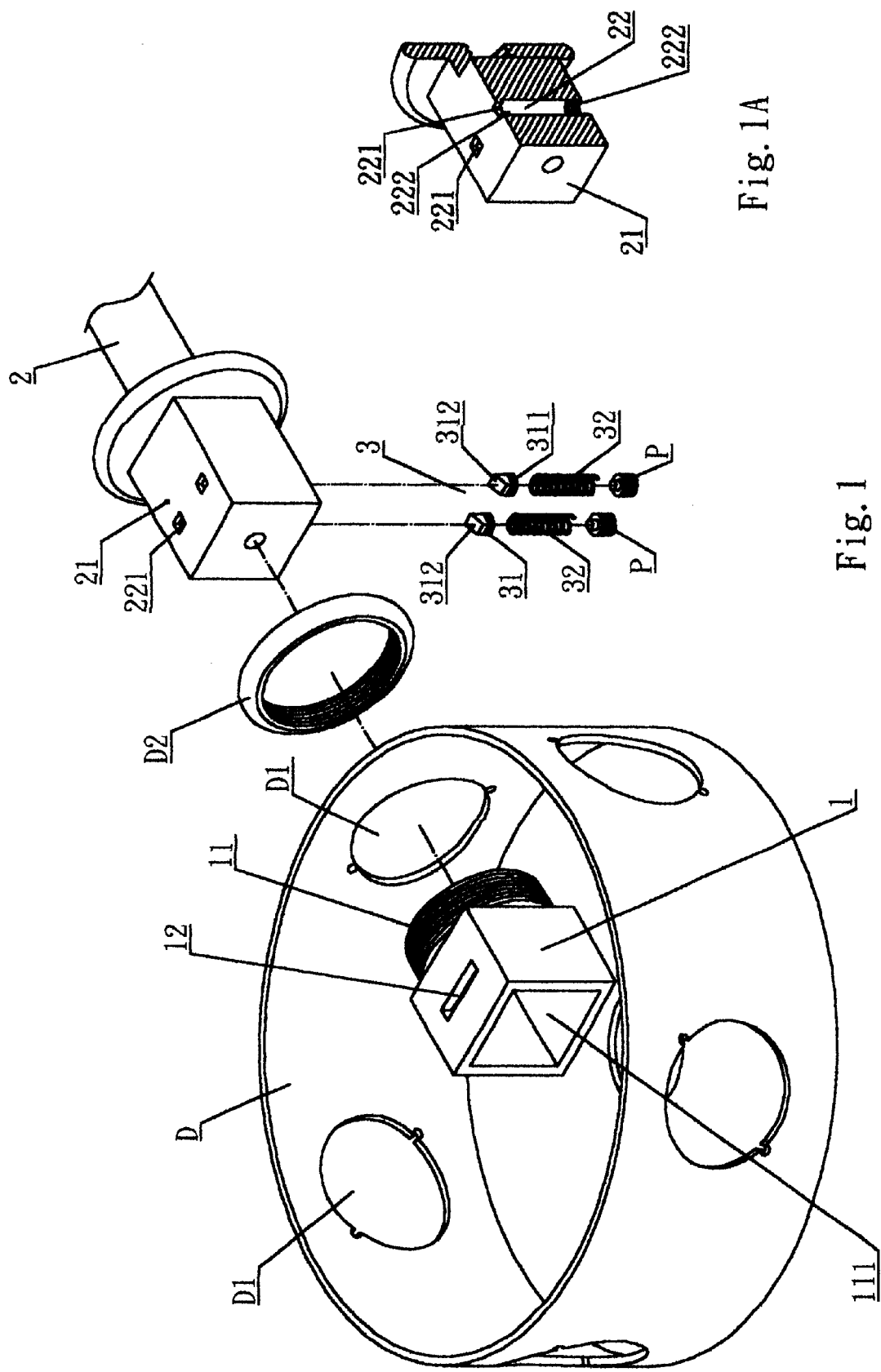
FIG. 1 is an exploded perspective view of the present invention.
Figure 2:
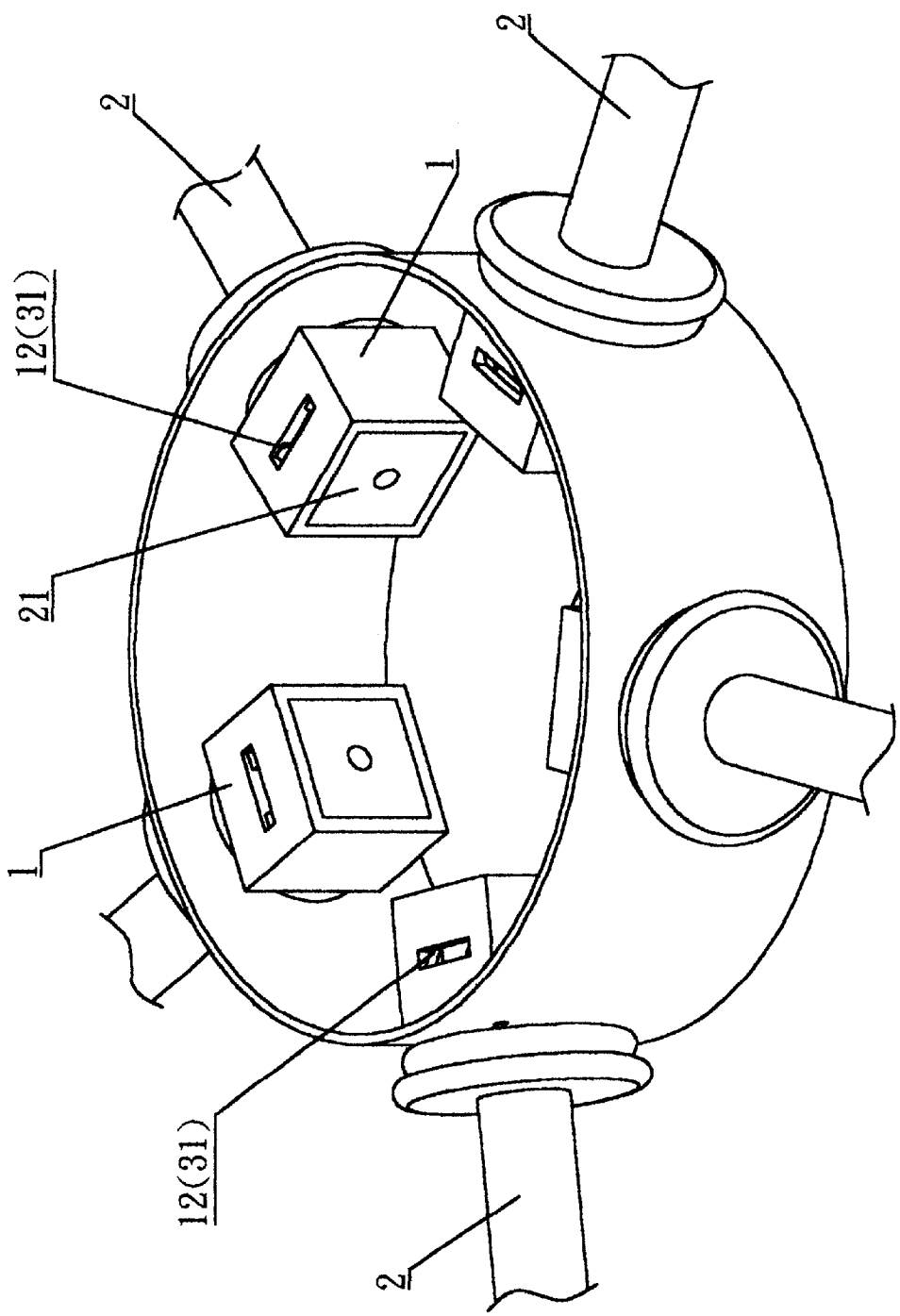
FIG. 2 is an assembled perspective view of the present invention.

Referring to FIGS. 1 and 2, the structure of the present invention is clearly shown. The present invention includes a retaining seat 1 installed at a via hole D1 at a lateral side of the wire box D and an inserting rod 2 inserted into the wire box D.

The lateral end of the retaining seat 1 is extended with an engaging portion 11. A polygonal though hole 111 is formed in the engaging portion 11. A portion of the engaging portion 11 passing through the wire box D is locked by a positioning ring D2 so as to position the retaining seat 1 in the inner side of the wire box D. A lateral end of the retaining seat 1 is an engaging groove 12 which is communicated with the though hole 111.

A front end of the inserting rod 2 is matched to the though hole 111 and is a polygonal end portion 21. The portion of the end portion 21 coupled to the engaging groove 12 of the retaining seat 1 is installed with two guide holes 22. A distal end of each guide hole 22 is a reduced output end 221. A front end of the output end 221 is formed with a larger stepped surface 223. A front end of the guide hole 22 is installed with a female threaded section 222 for engaging the buckling structure 3.

The buckling structure 3 is formed by an engaging block 31, a spring 32 next to the engaging block 31, and a locking stud P locked to the female threaded section 222. The locking stud P serves to position the engaging block 31 and the spring 32 in the guide hole 22. One end of the engaging block 31 resisting against the spring 32 has a larger annular surface 311. The larger annular surface 311 is exactly buckled to the larger stepped surface 223 of the guide hole 22. The buckling end 312 of the engaging block 31 is inclined at one side for preventing the inserting rod 2 from being pulled out from another side. After the engaging block 31 is locked, it exactly resists against the spring 32 and the engaging block 31 properly. Moreover, the inclined buckling end 312 of the engaging block 31 exactly protrudes from the output end 221 of the protruded end portion 21.

Figure 3A:
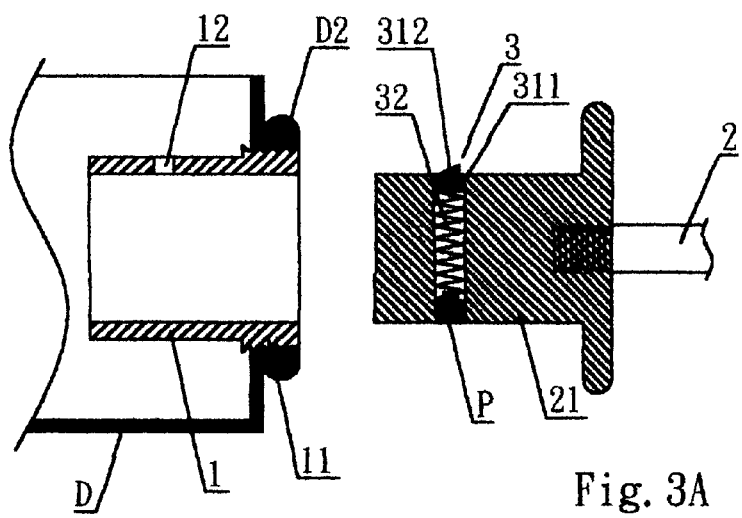
FIG. 3A is a plane cross section view of the present invention.
Figure 3B:
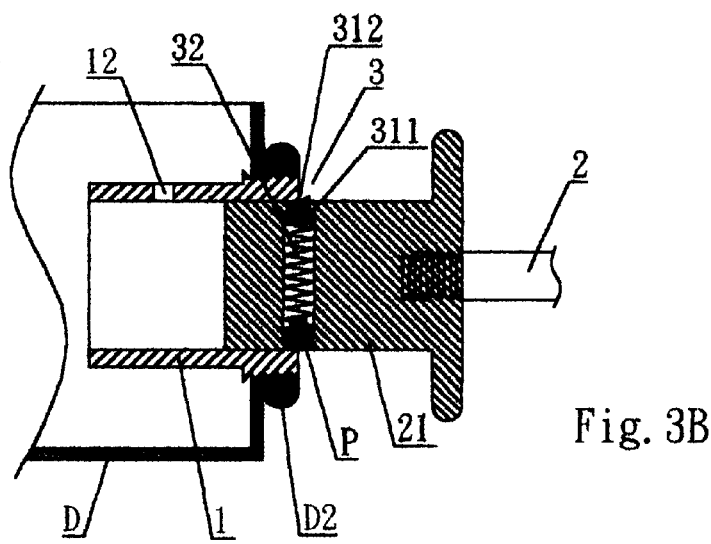
FIG. 3B is a plane cross section view showing that the inserting rod of the present invention is being inserted into the wire box.
Figure 3C:
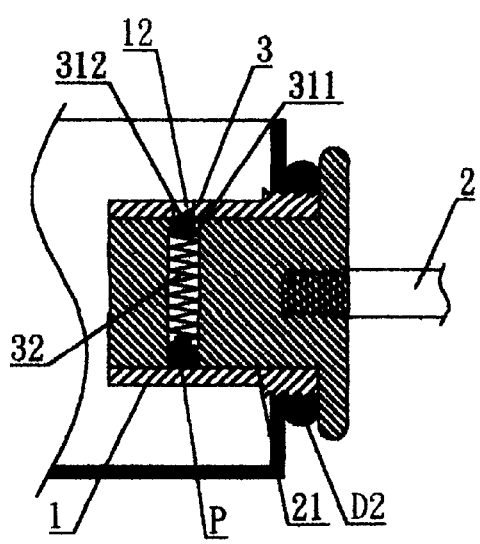
FIG. 3C is a plane cross section view showing that the inserting rod of the present invention has been inserted into the wire box.

The operation of the present invention is illustrated in FIG. 3. When the inserting rod 2 is not assembled to the wire box D, the inclined buckling end 312 of the buckling structure 3 at the end portion 21 can protrude out of the outer edge of the output end 221 of the end portion 21 since the larger annular surface 311 of the engaging block 31 exactly resists against the larger stepped surface 223 of the guide hole 22 (referring to FIG. 3A).

By the buckling structure 3 assembled to the inserting rod 2 and the inclined buckling end 312 of the engaging block 31, when the inserting rod 2 inserts into the though hole 111 of the retaining seat 1, the engaging block 31 at a front end of the inserting rod 2 is position-confined by the positioning ring D2 and the though hole 111 of the retaining seat 1. Thereby, the spring 32 is inwardly compressed properly so that the inserting rod 2 inserts into the retaining seat 1 successfully (referring to FIG. 3B).

When the inserting rod 2 completely inserts into the retaining seat 1, the buckling structure 3 at the end portion 21 of the inserting rod 2 is exactly matched to the engaging groove 12 of the retaining seat 1 so that the buckling end 312 of the engaging block 31 is ejected by the resilient force of the spring 32 so as to protrude out of the engaging groove 12. Since the engaging block 31 is inclined at one side, the vertical surface thereof resists against a lateral edge of the engaging groove 12. Thus, the inserting rod 2 can not be withdrawn backwards and thus is confined in the retaining seat 1 (referring to FIG. 3C).

It is appreciated, by the buckling structure 3, the inserting rod 2 is confined in the retaining seat 1. If it is desired to draw the inserting rod 2 out, it is necessary to press the engaging block 31 to reduce inwards by other tools so that the engaging block 31 releases from the buckling of the engaging groove 12 of the retaining seat 1 so as to draw out the inserting rod 2. In the wire box D, the inserting rod 2 cannot pull out from the retaining seat 1 for packaging, transfer or storage. Since the wire box D and the inserting rod 2 are detached and thus the volume can be reduced. Moreover, since the retaining seat 1 for being inserted by the inserting rod 2 is assembled in the wire box D in advance. In assembly, it is only necessary to insert the inserting rod 2 into the retaining seat 1 in the wire box D without using any locking tool, such as a stud. Thus, the user can assemble it conveniently.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lamp rod assembled device for assembling an inserting rod into a wire box comprising a retaining seat installed on via hole at a lateral side of the wire box and the inserting rod inserted into the wire box; wherein a lateral end of the retaining seat is extended with an engaging portion; a polygonal through hole is formed in the engaging portion; a portion of the engaging portion passing through the wire box is locked by a positioning ring so as to position the retaining seat in an inner side of the wire box; a lateral side of the retaining seat adjacent to the lateral end of the retaining seat extending with the engaging portion is an engaging groove which is communicated with the through hole;

a front end of the inserting rod is matched to the through hole and has a polygonal end portion; a portion of the end portion coupled to the engaging groove of the retaining seat is formed with two guide holes; each of the guide holes has a respective buckling structure; a distal end of each buckling structure is protruded out of an end portion of the inserting rod; after the inserting rod is inserted into the wire box; the protruded portion of each buckling structure exactly resists against the engaging groove of the retaining seat;

thereby, the inserting rod can be inserted into or detached from the wire box.

2. The lamp rod assembled device for assembling an inserting rod into a wire box as claim in claim 1, wherein a distal end of each guide hole is a reduced output end; a front end of the output end is formed with a larger stepped surface; a front end of each guide hole is installed with a female threaded section for engaging the buckling structure.

3. The lamp rod assembled device for assembling an inserting rod into a wire box as claim in claim 1, wherein each buckling structure is formed by an engaging block in the respective guide hole of the inserting rod, a spring next to the engaging block, and a locking stud locked to the female threaded section; the buckling structure has a resisting end; one side of the resisting end is inclined; the locking stud serves to position the engaging block and the spring in the guide hole; one end of the engaging block resisting against the spring has a larger annular surface; the larger annular surface is exactly buckled to the larger stepped surface of the respective guide hole.

* * * * *